March 2, 1971  R. MILBRANDT ET AL  3,566,595
APPARATUS FOR PICKING EARS OF CORN FROM THE GROUND
Filed Nov. 12, 1968  2 Sheets-Sheet 1
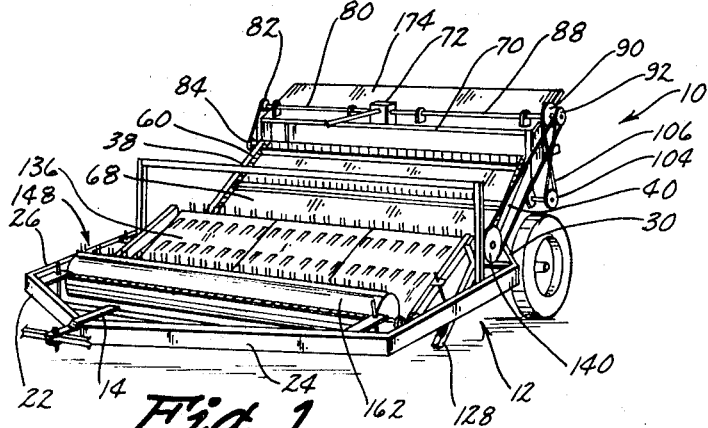
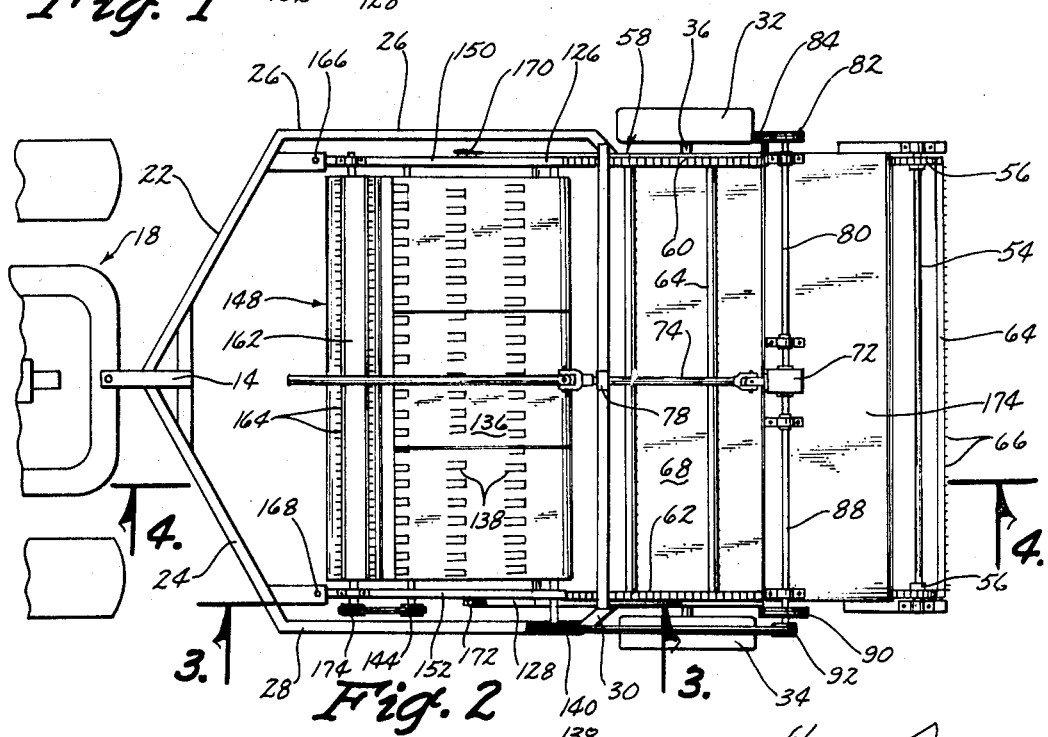
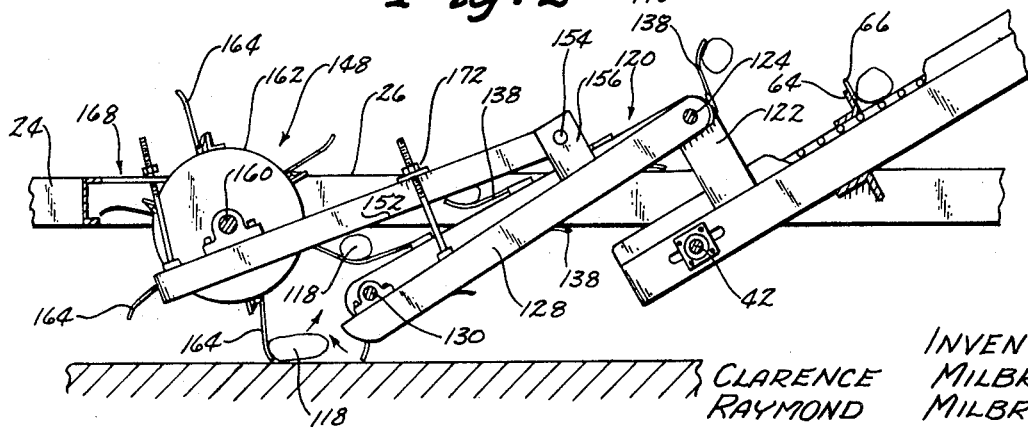
INVENTORS
CLARENCE MILBRANDT
RAYMOND MILBRANDT
BY
Zarley, McKee & Thomte
ATTORNEYS March 2, 1971  R. MILBRANDT ET AL  3,566,595
APPARATUS FOR PICKING EARS OF CORN FROM THE GROUND
Filed Nov. 12, 1968  2 Sheets-Sheet 2
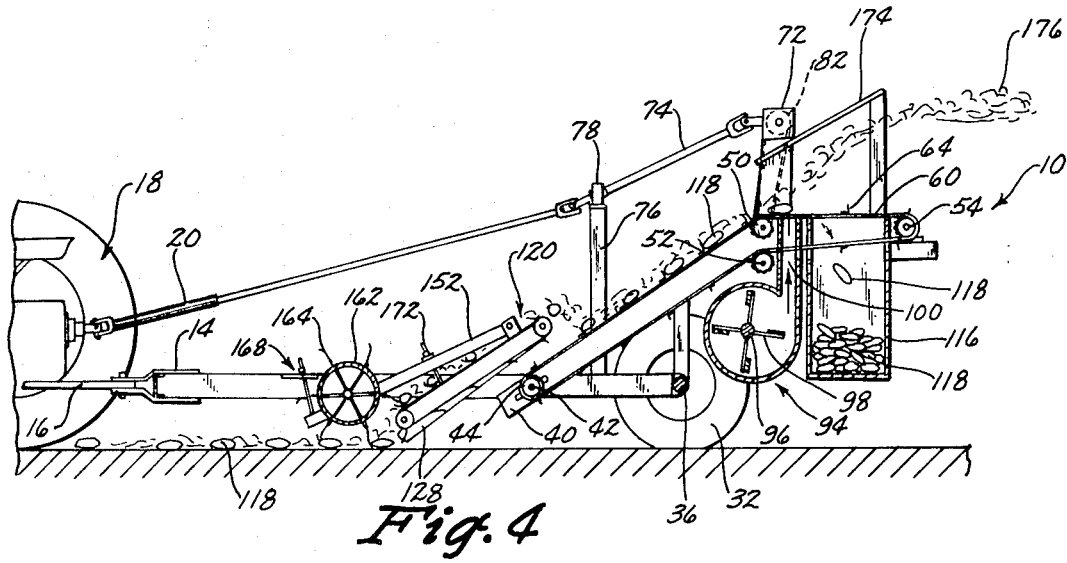
Fig. 4
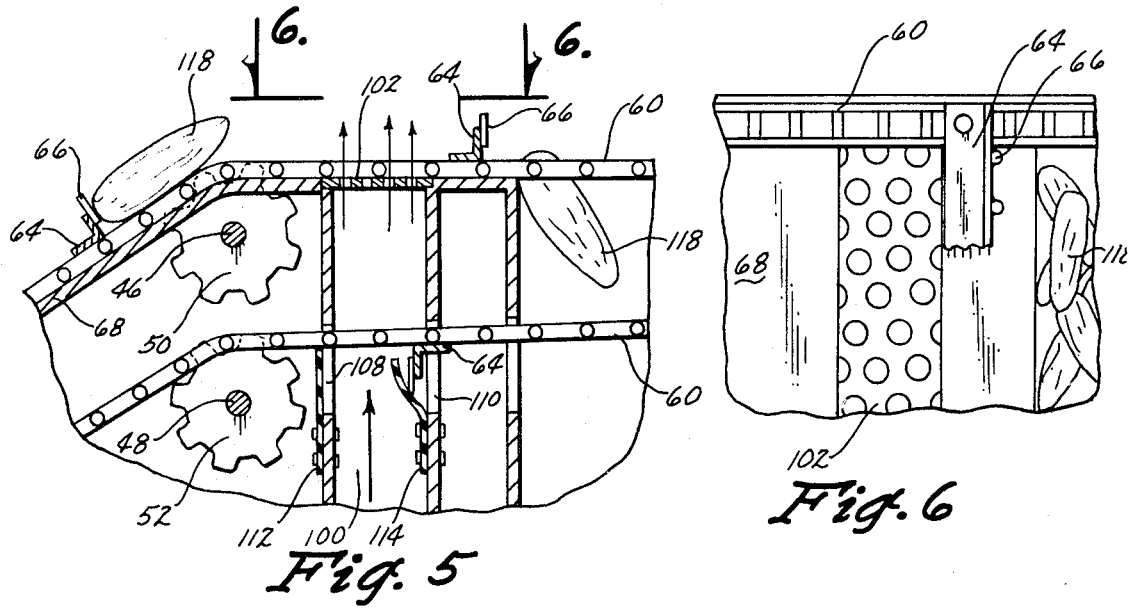
Fig. 5
Fig. 6
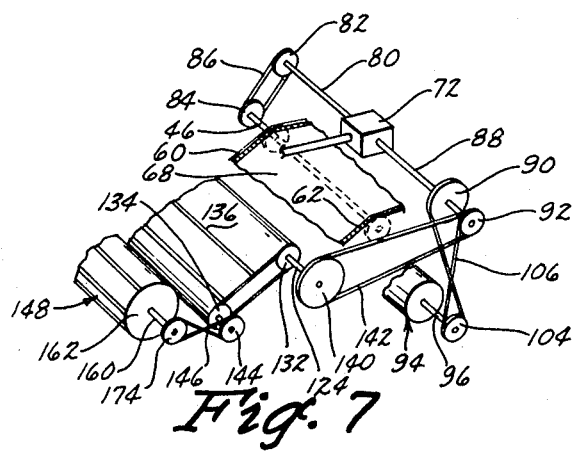
Fig. 7
INVENTORS
CLARENCE MILBRANDT
RAYMOND MILBRANDT
BY
Zarley, McKee & Thomte
ATTORNEYS

United States Patent Office 3,566,595
Patented Mar. 2, 1971

3,566,595
APPARATUS FOR PICKING EARS OF CORN FROM THE GROUND
Raymond Milbrandt and Clarence Milbrandt, both of Buffalo Center, Iowa 50424
Filed Nov. 12, 1968, Ser. No. 774,978
Int. Cl. A01d 87/04
U.S. Cl. 56—345    5 Claims

ABSTRACT OF THE DISCLOSURE

An apparatus for picking ears of corn from the ground including a wheeled frame means adapted to be pulled by a prime mover such as a tractor or the like. A pickup means is mounted on the forward end of the frame means and is adapted to pick the ears of corn from the ground and deposit the same on a rearwardly extending conveyor. The conveyor is adapted to convey the ears to a hopper or other suitable receptacle at the rearward end of the frame means. A blower means is mounted on the frame means below the conveyor and is adapted to force air upwardly through the ears of corn on the conveyor to blow any debris, such as cornstalks, trash, etc., therefrom. A deflecting shield is mounted over the conveyor and is adapted to deflect the debris being blown from the conveyor rearwardly from the apparatus.

---

Conventional corn picking machines are not able to pick ears of corn which have fallen to the ground. Additionally, the corn picking machines sometimes miss corn which is not standing completely upright.

Therefore, it is a principal object of this invention to provide an apparatus for picking ears of corn from the ground.

A further object of this invention is to provide an apparatus for picking ears of corn which includes means to blow the debris from the corn being picked.

A further object of this invention is to provide an apparatus for picking ears of corn including a pickup means at the forward end thereof which is vertically adjustable with respect to the ground.

A further object of this invention is to provide an apparatus for picking ears of corn which is driven by the tractor power take-off means.

A further object of this invention is to provide an apparatus for picking ears of corn from the ground which is efficient in operation.

A further object of this invention is to provide an apparatus for picking ears of corn from the ground which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the apparatus of this invention;

FIG. 2 is a top plan view of the apparatus of this invention with the prime mover being partially shown;

FIG. 3 is a fragmentary enlarged sectional view as seen along lines 3—3 of FIG. 2;

FIG. 4 is a sectional view as seen along lines 4—4 of FIG. 2;

FIG. 5 is a partial sectional view of the upper end of the blower means and the rearward end of the conveyor means of this invention;

FIG. 6 is a partial top plan view as seen along lines 6—6 of FIG. 5; and

FIG. 7 is a partial perspective view of the power train of this apparatus.

The apparatus of this invention is generally designated by the reference numeral 10 and includes a wheeled frame means 12 adapted to be detachably connected at its forward end 14 to the drawbar 16 of the prime mover such as a tractor 18. Tractor 18 includes a conventional power take-off having a rotatable universal joint shaft 20 extending rearwardly therefrom.

Frame means 12 generally includes forward frame members 22 and 24, side frame members 26 and 28, and rear frame portion 30. The wheels 32 and 34 are rotatably mounted on opposite ends of axle 36 which is operatively secured to the frame means 12. Frame members 38 and 40 are operatively secured to frame members 26 and 28 respectively and extend upwardly and rearwardly therefrom. The lower ends of frame members 38 and 40 also extend downwardly and forwardly with respect to the frame members 26 and 28 respectively. A shaft 42 is rotatably secured to and extends between the frame members 38 and 40 adjacent the lower ends thereof and have a sprocket means 44 provided thereon at each end thereof. A pair of spaced apart shafts 46 and 48 are operatively rotatably secured to and extend between the frame members 38 and 40 adjacent the upper ends thereof and have sprocket means 50 and 52 mounted thereon respectively. The numeral 54 generally designates a shaft which is rotatably mounted at the rearward end of the apparatus (FIG. 2) and has a sprocket means 56 mounted at opposite ends thereof. The numeral 58 generally comprises a conveyor means which is operatively mounted on the sprocket means 44, 50, 52, and 56. The conveyor means 58 includes a link chain means 60 operatively mounted on the sprockets at one end of the shafts 42, 46, 48 and 54 and also includes a link chain means 62 operatively mounted on the sprockets at the other ends of the shafts 42, 46, 48 and 54. A plurality of angular cleats 64 are secured to and extend between the chain means 60 and 62. The cleats 64 have a plurality of spaced apart fingers 66 secured thereto and extending upwardly therefrom as illustrated in FIG. 4. A shield 68 extends between the grain members 38 and 40 beneath the upper surface of the conveyor means to prevent the corn from passing downwardly therethrough. The numeral 70 generally designates a support means secured to the grain means 12 and which extends across the top portion thereof (FIG. 1) and which has a gear box 72 secured thereto. The gear box 72 is operatively connected to the member 20 by means of a coupling shaft means 74. A support means 76 is also provided on the grain means 12 adapted to lend further support to the rotatable shaft 74 by means of a bearing means 78 provided thereon through which the shaft 74 extends. A shaft 80 extends from one end of the gear box 72 and has a pulley 82 secured to the outer end thereof. As seen in FIG. 7, a pulley 84 is mounted on one end of the shaft 46 and a V-belt 86 extends around the pulleys 82 and 84. A shaft 88 rotatably extends from the other side of the gear box 72 and has a pair of pulleys 90 and 92 operatively secured thereto adjacent the outer end thereof as best seen in FIG. 7.

The numeral 94 generally designates a blower or fan means provided on the frame means 12 and including a rotatable shaft 96 having a plurality of vanes 98 extending radially therefrom. A housing, which is open at one end, extends around the blower means and has a discharge condnit 100 extending upwardly therefrom as best illustrated in FIG. 4. The upper end of the discharge conduit 100 is covered by the perforated plate means 102

(FIG. 6). The shaft 96 has a pulley 104 mounted at one end thereof and a belt 106 extends around pulley 104 and pulley 90 in the manner seen in FIG. 7. As seen in FIG. 5, the lower half of the conveyor means extends through openings 108 and 110 in the discharge conduit 100. The openings 108 and 110 are partially closed by a flexible seal means 112 and 114 (FIG. 5) which are deflected by the cleats 64 as the chain is moved to the openings. The purpose of the seal means 112 and 114 is to limit the loss of air from the discharge conduit 100. The numeral 116 generally designates a hopper means or other suitable receptacle provided at the rearward end of the frame means 12 and which has an open upper end so that the ears of corn 118 may be dumped therein by the conveyor means 58. If desired, a second conveyor means could be provided on the apparatus to convey the ears of corn from the rearward end of the conveyor means 58 or from the hopper means 116 to a wagon or the like which could be trailed behind the frame means 12.

The numeral 120 generally designates a pickup of the belt type which is operatively pivotally connected at its rearward end to the forward end of the conveyor means 58. Conveyor means 58 has a pair of spaced apart arms 122 secured thereto extending upwardly therefrom and which has a shaft 124 rotatably mounted therein and extending therebetween. Pickup 120 includes a pair of opposite frame members 126 and 128 which extend downwardly and forwardly from the shaft 124. A shaft 130 is operatively rotatably secured to the forward ends of the frame members 126 and 128 and extends therebetween. A cylindrical pulley 132 is mounted on the shaft 124 while the cylindrical pulley 134 is mounted on the shaft 130. A flexible continuous belt 136 extends around the pulleys 132 and 134 and has a plurality of flexible pickup fingers 138 mounted thereon. A pulley 140 is secured to one end of the shaft 124 and a belt 142 extends around pulleys 140 and 92. A pulley 144 is mounted on the outer end of shaft 130 and has a belt 146 mounted thereon.

The numeral 148 generally designates a second pickup means which is mounted forwardly of the pickup 120. Pickup 148 includes a pair of spaced apart frame members 150 and 152 having a shaft 154 rotatably mounted in and extending between the rearward ends thereof. Shaft 154 is supported at its opposite ends by brackets 156 which are operatively secured to frame members 126 and 128. A shaft 160 is rotatably mounted on and extends between the forward ends of frame members 150 and 152 and has a cylinder 162 mounted thereon. Cylinder 162 has a plurality of spaced apart rows of flexible pickup fingers 164 which extend outwardly therefrom as best illustrated in FIG. 3. The forward ends of frame members 150 and 152 are secured to frame members 22 and 24 respectively by an adjustment bolt assembly 166 and 168 respectively. As can be seen in FIG. 3, the forward end of the pickup 148 may be raised or lowered with respect to the ground through the use of the adjustment bolt assembly. Adjustment bolt assemblies 170 and 172 operatively interconnect the frame members 126, 150 and 128, 152 so that the relationship between the pickup 120 and pickup 148 may be varied. Thus, the lowering of the forward end of the pickup 148 will cause the forward end of the pickup 120 to also be lowered. The forward end of the pickup 120 may be raised or lowered with respect to the ground and with respect to the pickup 148 without affecting the relative position of the pickup 148 with respect to the ground through the use of the adjustment bolt assemblies 170 and 172. A pulley 174 is mounted on the outer end of shaft 160 and belt 144 extends therearound as illustrated in FIG. 7.

The normal method of operation is as follows. The wheel frame means 12 is connected to the tractor and the power take-off of the tractor is operatively connected to the shaft means 74. The operation of the power take-off causes the shaft 74 to be rotated which in turn causes the shafts 80 and 88 to be rotated. The rotation of the shaft 80 causes the conveyor means 58 to be operated while the rotation of shaft 88 causes the blower means 94, pickup 120 and pickup 148 to be operated. The pickup 148 is rotated in a counterclockwise direction as viewed in FIG. 3 while the pickup 120 is rotated in a clockwise direction as viewed in FIG. 3. The forward ends of the pickup 148 and pickup 120 are adjusted through the use of their adjustment bolt assemblies so that the pickup fingers 164 and 138 will sufficiently engage the ground to pick the ears of corn 118 therefrom. As seen in FIG. 3 the pickup fingers 164 and the pickup fingers 138 cause the ears of corn 118 to be deposited on the pickup 120 which carries the ears rearwardly to the conveyor means 58. The conveyor means 58 conveys the ears to the hopper 116. A certain amount of trash or debris such as corn stalks or the like will also be picked with the ears of corn and will be conveyed rearwardly by the pickup 120 and conveyor means 58. The blower means 94 supplies a strong flow of air upwardly through discharge conduit 100 and through the perforated plate 102 to blow the debris from the ears 118 as the debris passes over the perforated plate 102. A deflecting shield 174 is mounted over the rearward end of the conveyor means 58 and extends upwardly and rearwardly therefrom as illustrated in FIG. 4. The debris generally indicated at 176 is blown upwardly from the ears 118 and is deflected upwardly and rearwardly by the shield 174. As previously stated, a conveyor means such as an elevator or the like could be placed in communication with the hopper 116 or the rearward end of the conveyor 58 to convey the ears 118 to a storage area such as a trailing wagon or the like. It should be noted that the pickup 148 could possibly be eliminated from the apparatus but the efficiency of the apparatus would be adversely affected.

Thus, it can be seen that a unique apparatus has been provided which has the ability to pick ears of corn from the ground and supply the same to a hopper. The apparatus disclosed herein provides a method of retrieving falling ears of corn which would otherwise not be harvested. The apparatus of this invention is extremely efficient and has the ability to be adjusted to a variety of ground conditions. Further, a means has been provided for eliminating objectionable debris from the ears which are being picked from the ground. Thus it can be seen that the apparatus accomplishes at least all of its stated objectives.

Some changes may be made in the construction and arrangement of our apparatus for picking ears of corn from the ground without departing from the real spirit and purpose of my invention, and it is my intention to cover by my claims, any modified forms of structure or use of mechanical equivalents which may be reasonably included within their scope.

We claim:

1. In an apparatus for picking ears of corn from the ground, comprising, a first wheeled frame means having rearward and forward ends, a conveyor means on said first frame means extending upwardly and rearwardly with respect thereto and having its forward end positioned rearwardly of the forward end thereof, a second frame means having forward and rearward ends and being operatively selectively pivotally secured at its rearward end about a horizontal axis to said first frame means, said second frame means extending upwardly and rearwardly from its forward end, a first pickup means on said second frame means, a third frame means having rearward and forward ends and being operatively selectively pivotally secured at its rearward end about a horizontal axis to said second frame means, a second pickup means at the forward end of said third frame means, said first and second pickup means being selectively movable with respect to said first frame means and with respect to each other to pick ears of corn from the ground and deposit the ears of corn on said conveyor means, said conveyor means adapted to convey the ears of corn to a receptacle means rearwardly thereof, and a power means powering said first and second pickup means and said conveyor means.

2. The apparatus of claim 1 wherein said second pickup means comprises as elongated cylinder rotatably mounted on said third frame means adjacent the forward end thereof, said cylinder having a plurality of pickup fingers secured thereto and extending therefrom.

3. The apparatus of claim 2 wherein said first pickup means comprises a pair of spaced apart rotatable shafts mounted on said second frame means, a flexible belt extending around said shafts, and a plurality of pickup fingers secured to said belt, said first and second pickup means being operated in opposite directions by said power means whereby said first and second pickup means cooperate to pick the ears of corn from the ground.

4. The apparatus of claim 1 wherein a blower means is mounted on said first frame means below said conveyor means adapted to direct air upwardly through said ears of corn on said conveyor means to blow any debris from said conveyor means.

5. The apparatus of claim 4 wherein a deflecting shield is mounted on said first frame means above said conveyor means adapted to rearwardly deflect the debris being blown from said conveyor means.

References Cited

UNITED STATES PATENTS

| 2,373,426 | 4/1945 | Spafford | 171—17 |
| 2,639,573 | 5/1953 | McLaughlin | 56—328 |
| 2,891,373 | 6/1959 | Bauer et al. | 56—345 |
| 2,993,322 | 7/1961 | Wiebe | 56—328 |
| 3,107,475 | 10/1963 | Gustafson | 56—328 |

ANTONIO F. GUIDA, Primary Examiner

U.S. Cl. X.R.

171—101